US012767342B1

(12) United States Patent
Clark et al.

(10) Patent No.: US 12,767,342 B1
(45) Date of Patent: Oct. 20, 2026

(54) PREHEATING AIRCRAFT PROPULSION SYSTEM LUBRICANT

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/259,741

(22) Filed: Jul. 3, 2025

(51) Int. Cl.
*B64D 33/00* (2006.01)
*B64D 27/10* (2006.01)
*B64D 31/06* (2006.01)

(52) U.S. Cl.
CPC ............ *B64D 33/00* (2013.01); *B64D 27/10* (2013.01); *B64D 31/06* (2013.01)

(58) Field of Classification Search
CPC ......... B64D 33/00; B64D 27/10; B64D 31/06
See application file for complete search history.

(56) References Cited

U.S. PATENT DOCUMENTS 2,289,981 A * 7/1942 Mcdonald .............. F01M 5/021 219/512
7,451,753 B2 * 11/2008 Bell ........................ F02C 7/224 123/196 R
9,810,113 B2 * 11/2017 Krug ....................... F01M 5/007
11,236,672 B2 * 2/2022 Roberge ................... F01M 1/02

FOREIGN PATENT DOCUMENTS

WO WO-2015044614 A1 * 4/2015 ............. F01D 25/18

* cited by examiner

*Primary Examiner* — Justin M Benedik
(74) *Attorney, Agent, or Firm* — Getz Balich LLC

(57) ABSTRACT

A method is provided for operating an aircraft system. During this method, a first temperature of a lubricant is determined. The aircraft system is operated in a first warmup mode when the first temperature of the lubricant is below a first threshold. The operating of the aircraft system in the first warmup mode includes driving rotation of a rotating structure about an axis and heating the first quantity of the lubricant contained in the first reservoir using a first electric heater. A startup of the turbine engine is initiated following the operating of the aircraft system in the first warmup mode.

20 Claims, 4 Drawing Sheets

PREHEATING AIRCRAFT PROPULSION SYSTEM LUBRICANT

BACKGROUND OF THE DISCLOSURE

1. Technical Field

This disclosure relates generally to an aircraft and, more particularly, to a lubrication system for an aircraft powerplant.

2. Background Information

An aircraft powerplant may include a lubrication system servicing various components and accessories. Various types and configurations of lubrication systems are known in the art. While these known lubrication systems have various benefits, there is still room in the art for improvement.

SUMMARY OF THE DISCLOSURE

According to an aspect of the present disclosure, a method is provided for operating an aircraft system. The aircraft system includes a turbine engine, a lubrication system and an electrical system. The turbine engine includes a flowpath, a rotating structure, one or more engine components, a compressor section, a combustor section and a turbine section. The flowpath extends through the compressor section, the combustor section and the turbine section. The rotating structure includes a first bladed engine rotor in the compressor section or the turbine section. The lubrication system is configured to lubricate the one or more engine components using lubricant. The lubrication system includes a first reservoir configured to contain a first quantity of the lubricant. The electrical system includes a first electric heater in thermal communication with the first quantity of the lubricant contained in the first reservoir. During the method, a first temperature of the lubricant is determined. The aircraft system is operated in a first warmup mode when the first temperature of the lubricant is below a first threshold. The operating of the aircraft system in the first warmup mode includes driving rotation of the rotating structure about an axis and heating the first quantity of the lubricant contained in the first reservoir using the first electric heater. A startup of the turbine engine is initiated following the operating of the aircraft system in the first warmup mode.

According to another aspect of the present disclosure, another method is provided for operating an aircraft system. The aircraft system includes a turbine engine, a lubrication system and an electrical system. The turbine engine includes a flowpath, a rotating structure, one or more engine components, a compressor section, a combustor section and a turbine section. The flowpath extends through the compressor section, the combustor section and the turbine section. The rotating structure includes a first bladed engine rotor in the compressor section or the turbine section. The lubrication system is configured to lubricate the one or more engine components using lubricant. The lubrication system includes a first reservoir configured to contain a first quantity of the lubricant. The electrical system includes an electric machine and a first electric heater. The electric machine is operatively coupled to the rotating structure. The first electric heater is in thermal communication with the first quantity of the lubricant contained in the first reservoir. During the method, the aircraft system is operated in a first warmup mode. The operating of the aircraft system in the first warmup mode includes heating the first quantity of the lubricant contained in the first reservoir using the first electric heater. The aircraft system is operated in a second warmup mode following the operating of the aircraft system in the first warmup mode. The operating of the aircraft system in the second warmup mode includes driving rotation of the rotating structure about an axis using the electric machine. A startup of the turbine engine is initiated following the operating of the aircraft system in the second warmup mode.

According to still another aspect of the present disclosure, an aircraft system is provided that includes a turbine engine, a lubrication system, an electrical system and a control system. The turbine engine includes a flowpath, a rotating structure, one or more engine components, a compressor section, a combustor section and a turbine section. The flowpath extends through the compressor section, the combustor section and the turbine section. The rotating structure includes a compressor rotor in the compressor section and a turbine rotor in the turbine section. The lubrication system is configured to lubricate the one or more engine components using lubricant. The lubrication system includes a first reservoir configured to contain a first quantity of the lubricant. The electrical system includes a motor-generator and a first electric heater. The motor-generator is operatively coupled to the rotating structure. The first electric heater is in thermal communication with the first quantity of the lubricant contained in the first reservoir. The control system is configured operate the aircraft system in a first warmup mode and subsequently in a startup mode. The motor-generator drives rotation of the rotating structure about an axis and the first electric heater heats the first quantity of the lubricant contained in the first reservoir during the first warmup mode. Combustion within the turbine engine is started during the startup mode.

The aircraft system may be operated in the first warmup mode while the electric machine is turned off. In addition or alternatively, the aircraft system may be operated in the second warmup mode while the first electric heater is turned off.

The operating of the aircraft system in the first warmup mode may also include driving rotation of the rotating structure about the axis using the electric machine. The aircraft system may be operated in the second warmup mode while the first electric heater is turned off.

The one or more engine components may include a bearing rotatably supporting the rotating structure.

The rotating structure may be rotatably driven about the axis during the first warmup mode using a drivetrain component. The one or more engine components may include the drivetrain component.

The rotating structure may be rotated about the axis during the first warmup mode at a sub-idle rotational speed.

The rotating structure may be rotated about the axis during the first warmup mode at a first rotational speed. The rotating structure may be rotated about the axis during the startup of the turbine engine at a second rotational speed that is greater than the first rotational speed.

The method may also include operating the aircraft system in a second warmup mode prior to the operating of the aircraft system in the first warmup mode. The operating of the aircraft system in the second warmup mode may include driving rotation of the rotating structure about the axis while the first electric heater is turned off.

The method may also include operating the aircraft system in a second warmup mode prior to the operating of the aircraft system in the first warmup mode. The operating of the aircraft system in the second warmup mode may include heating the first quantity of the lubricant contained in the first reservoir using the first electric heater while the rotating structure is stationary or windmilling.

The method may also include: determining a second temperature of the lubricant; and initiating the startup of the turbine engine when the second temperature of the lubricant is equal to or above the first threshold.

The method may also include: determining a second temperature of the lubricant; and initiating the startup of the turbine engine when the second temperature of the lubricant is equal to or above a second threshold that is greater than the first threshold.

The method may also include operating the aircraft system in a second warmup mode when the first temperature of the lubricant is equal to or above the first threshold. The operating of the aircraft system in the second warmup mode may include driving rotation of the rotating structure about the axis while the first electric heater is turned off.

The lubrication system may also include a second reservoir configured to contain a second quantity of the lubricant. The electrical system may also include a second electric heater in thermal communication with the second quantity of the lubricant contained in the second reservoir. The operating of the aircraft system in the first warmup mode may also include heating the second quantity of the lubricant contained in the second reservoir using the second electric heater.

The lubrication system may also include a second reservoir configured to contain a second quantity of the lubricant. The first reservoir may be a main reservoir for the lubrication system. The second reservoir may be an auxiliary reservoir for the lubrication system.

The lubrication system may also include a second reservoir configured to contain a second quantity of the lubricant. The first reservoir may be an auxiliary reservoir for the lubrication system. The second reservoir may be a main reservoir for the lubrication system.

The method may also include generating electricity using an electric machine and storing the electricity using a power storage. The first electric heater may be electrically powered using the power storage.

The electric machine may drive the rotation of the rotating structure about the axis and the electric machine may be electrically powered using the power storage during the operating of the aircraft system in the first warmup mode.

An electric motor may drive the rotation of the rotating structure about the axis and the electric motor and the first electric heater may be electrically powered using a power source during the operating of the aircraft system in the first warmup mode. The power source may be disposed remote from the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
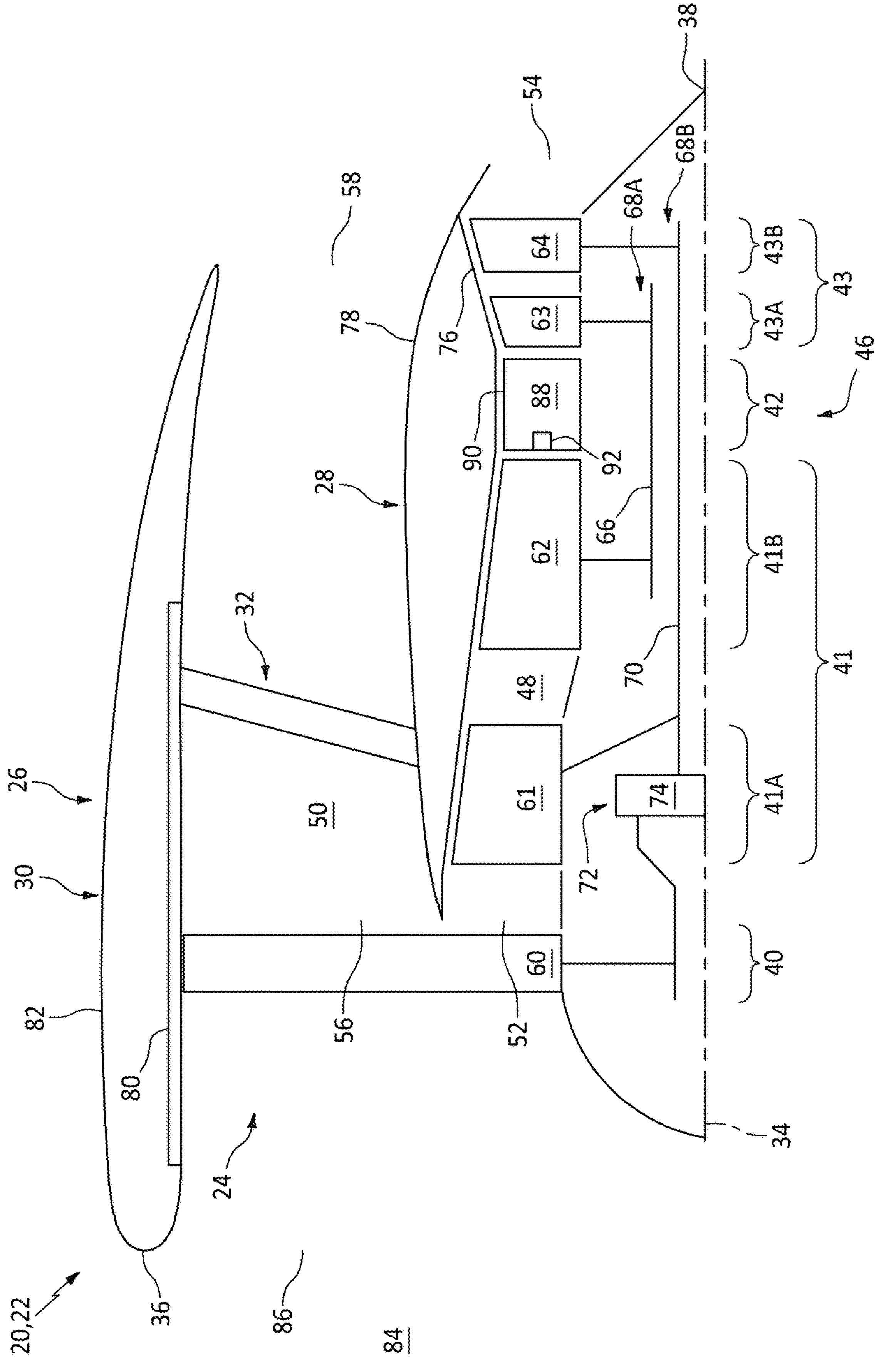
FIG. 1 is a partial schematic illustration of a propulsion system for an aircraft.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 extends axially along an axis 34 of the aircraft propulsion system 22 between an axial upstream, forward end 36 of the aircraft propulsion system 22 and an axial downstream, aft end 38 of the aircraft propulsion system 22. Briefly, the propulsion system axis 34 may be a centerline axis of the aircraft propulsion system 22, the turbine engine 24 and/or one or more of its members. The propulsion system axis 34 may also or alternatively be a rotational axis for one or more members of the turbine engine 24.

The aircraft propulsion system 22 and its turbine engine 24 of FIG. 1 include a propulsor section 40 (e.g., a fan section), a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B. At least (or only) the LPC section 41A, the HPC section 41B, the combustor section 42, the HPT section 43A and the LPT section 43B collectively form a core 46 (e.g., a gas generator) of the turbine engine 24. The aircraft propulsion system 22 and its turbine engine 24 of FIG. 1 also include a core flowpath 48 (e.g., an annular core flowpath) and a bypass flowpath 50 (e.g., an annular bypass flowpath). The core flowpath 48 extends sequentially through the LPC section 41A, the HPC section 41B, the combustor section 42, the HPT section 43A and the LPT section 43B from an airflow inlet 52 into the core flowpath 48 to a combustion products exhaust 54 out from the core flowpath 48. The bypass flowpath 50 extends through a bypass duct from an airflow inlet 56 into the bypass flowpath 50 to an airflow exhaust 58 from the bypass flowpath 50, where the bypass duct may be formed by the inner housing structure 28 and the outer housing structure 30. The bypass flowpath 50 and its bypass duct are configured to bypass (e.g., are disposed radially outboard of and extend along) the engine core 46 and the inner housing structure 28.

The propulsor section 40, the LPC section 41A, the HPC section 41B, the combustor section 42, the HPT section 43A and the LPT section 43B may be arranged sequentially along the propulsion system axis 34 within the propulsion system housing 26. The propulsor section 40 includes a bladed propulsor rotor 60; e.g., a fan rotor. The LPC section 41A includes a bladed low pressure compressor (LPC) rotor 61. The HPC section 41B includes a bladed high pressure compressor (HPC) rotor 62. The HPT section 43A includes a bladed high pressure turbine (HPT) rotor 63. The LPT section 43B includes a bladed low pressure turbine (LPT) rotor 64. Each of these engine rotors 60-64 includes a rotor base (e.g., a disk or a hub) and a plurality of rotor blades (e.g., airfoils, vanes, etc.). The rotor blades may be arranged into one or more stages axially along the respective engine rotor. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 62 is coupled to and rotatable with the HPT rotor 63. The HPC rotor 62 of FIG. 1, for example, is connected to the HPT rotor 63 through a high speed shaft 66. At least (or only) the HPC rotor 62, the HPT rotor 63 and the high speed shaft 66 collectively form a high speed rotating structure 68A; e.g., a high speed spool of the turbine engine 24 and its engine core 46. This high speed rotating structure 68A of FIG. 1 and its members 62, 63 and 66 are rotatable about the propulsion system axis 34. However, it is contemplated the high speed rotating structure 68A may alternatively be rotatable about another axis radially and/or angularly offset from the rotational axis of the propulsor rotor 60 and/or the centerline axis of the turbine engine 24.

The LPC rotor 61 is coupled to and rotatable with the LPT rotor 64. The LPC rotor 61 of FIG. 1, for example, is connected to the LPT rotor 64 through a low speed shaft 70. At least (or only) the LPC rotor 61, the LPT rotor 64 and the low speed shaft 70 collectively form a low speed rotating structure 68B; e.g., a low speed spool of the turbine engine 24 and its engine core 46. This low speed rotating structure 68B of FIG. 1 and its members 61, 64 and 70 are rotatable about the propulsion system axis 34. However, it is contemplated the low speed rotating structure 68B may alternatively be rotatable about another axis radially and/or angularly offset from the rotational axis of the propulsor rotor 60 and/or the centerline axis of the turbine engine 24.

The low speed rotating structure 68B is coupled to the propulsor rotor 60 through a rotating structure-to-propulsor (RSP) drivetrain 72. The RSP drivetrain 72 may be configured as a geared drivetrain, where a geartrain 74 (e.g., a transmission, a speed change device, an epicyclic geartrain, etc.) is disposed between and operatively couples the propulsor rotor 60 to the low speed rotating structure 68B and its LPT rotor 64. With this arrangement, the propulsor rotor 60 may rotate at a different (e.g., slower) rotational speed than the low speed rotating structure 68B and its LPT rotor 64. Here, the propulsor rotor 60 and the low speed rotating structure 68B may rotate in a common (the same) direction about the propulsion system axis 34 or in opposite directions about the propulsion system axis 34 depending, for example, upon the specific configuration of the geartrain 74. Alternatively, the RSP drivetrain 72 may be configured as a direct-drive drivetrain, where the geartrain 74 is omitted. With such an arrangement, the propulsor rotor 60 rotates at a common (the same) rotational speed as the low speed rotating structure 68B and its LPT rotor 64.

The inner housing structure 28 of FIG. 1 includes an inner case 76 (e.g., a core case) for the turbine engine 24, and an inner nacelle structure 78 (sometimes referred to as an inner fixed structure (IFS)). The inner case 76 is disposed radially outboard of, extends axially along and may circumscribe one or more or all of the engine sections 41A-43B and the engine rotors 61-64. The inner case 76 may thereby house and provide a support structure for the respective engine sections 41A-43B and the engine rotors 61-64. The inner nacelle structure 78 is configured to provide an aerodynamic cover over the engine core 46 and its inner case 76. The inner housing structure 28 and its inner nacelle structure 78 may also form a radial inner peripheral boundary of the bypass flowpath 50.

The outer housing structure 30 of FIG. 1 includes an outer case 80 (e.g., a fan case) for the turbine engine 24 and an outer nacelle structure 82. The outer case 80 is disposed radially outboard of, extends axially along and may circumscribe the propulsor section 40 and its propulsor rotor 60. The outer case 80 may thereby house and may be configured as a containment structure for the propulsor section 40 and its propulsor rotor 60. The outer nacelle structure 82 is configured to provide an aerodynamic cover over the outer case 80. The outer housing structure 30 and its outer nacelle structure 82 may also form a radial outer peripheral boundary of the bypass flowpath 50. Of course, where the aircraft propulsion system 22 is alternatively configured as an open propulsor rotor propulsion system (e.g., the propulsor rotor 60 is an open propulsor rotor), the outer housing structure 30 may be omitted to expose the propulsor rotor 60 and vanes of the guide vane structure 32 to an environment 84 external to the aircraft and its aircraft propulsion system 22.

During operation of the aircraft propulsion system 22 of FIG. 1, ambient air from the external environment 84 enters the aircraft propulsion system 22 and its turbine engine 24 through an airflow inlet 86. This air is propelled by the rotating propulsor rotor 60 in a downstream, aft direction towards the propulsion system aft end 38.

An outer stream of the air propelled by the rotating propulsor rotor 60 is directed into the bypass flowpath 50 through its bypass inlet 56, which air entering the bypass flowpath 50 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 58 to provide forward thrust. This propulsion of the bypass air may account for a majority of the forward thrust generated by the aircraft propulsion system 22 and its turbine engine 24 of FIG. 1.

An inner stream of the air propelled by the rotating propulsor rotor 60 is directed into the core flowpath 48 through its core inlet 52, which air entering the core flowpath 48 may be referred to as "core air". This core air is compressed by the LPC rotor 61 and the HPC rotor 62 and is directed into a combustion chamber 88 (e.g., annular combustion chamber) of a combustor 90 (e.g., annular combustor) in the combustor section 42. Fuel is injected into the combustion chamber 88 by one or more fuel injectors 92 and mixed with the compressed core air to provide a fuel-air mixture. This fuel-air mixture is ignited and combustion products thereof flow through and sequentially drive rotation of the HPT rotor 63 and the LPT rotor 64. The rotation of the HPT rotor 63 and the LPT rotor 64 respectively drive rotation of the HPC rotor 62 and the LPC rotor 61 and, thus, compression of the air received from the core inlet 52. The rotation of the LPT rotor 64 also drives rotation of the propulsor rotor 60 through the RSP drivetrain 72.

While the turbine engine 24 is described above with a particular two rotating structure arrangement (e.g., a two-spool architecture), the present disclosure is not limited thereto. For example, the LPC rotor 61 may be omitted to configure the LPT rotor 64 as a power turbine (PT) rotor for the propulsor rotor 60. The turbine engine 24 may also or alternatively include another rotating structure with a bladed compressor rotor in the compressor section 41 and a bladed turbine rotor in the turbine section 43; e.g., an intermediate speed spool for the engine core 46.

Figure 2:
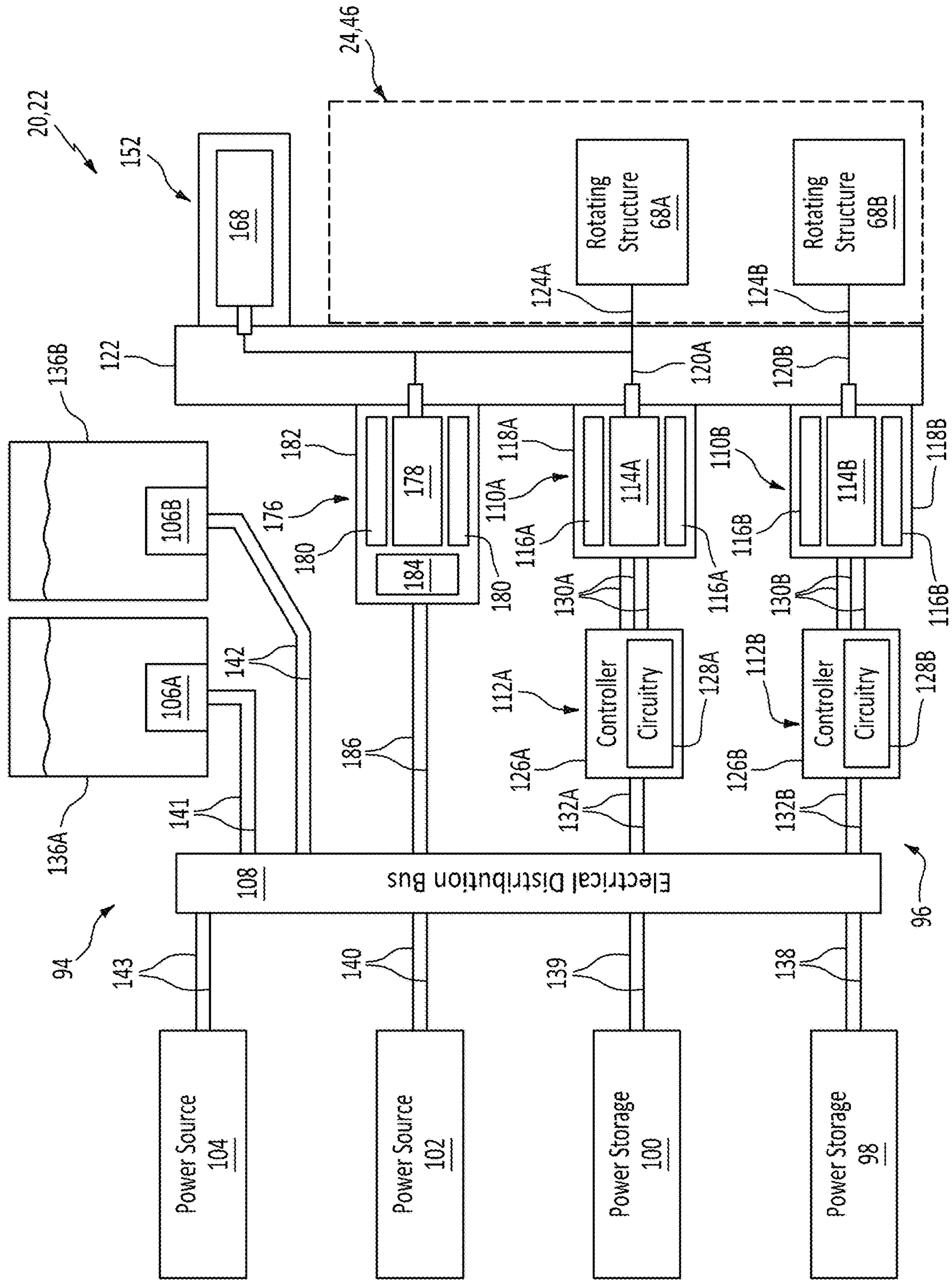
FIG. 2 is a schematic illustration an electrical system for the propulsion system.

FIG. 2 is a partial schematic illustration of an electrical system 94 for the aircraft propulsion system 22 and its turbine engine 24 (see also FIG. 1). This electrical system 94 may be configured to control, perform and/or otherwise facilitate one or more operations for the aircraft propulsion system 22 during operation of the turbine engine 24. The electrical system 94 may also or alternatively be configured to control, perform and/or otherwise facilitate at least one operation for the aircraft propulsion system 22 while the turbine engine 24 is non-operational; e.g., turned off, depowered, etc. For example, the electrical system 94 may facilitate a lubricant warmup procedure for the aircraft propulsion system 22 (e.g., immediately) prior to and/or during turbine engine startup.

The electrical system 94 of FIG. 2 includes an electric machine system 96, one or more electrical power storages 98 and 100, one or more power sources 102 and 104, one or more electric heaters 106A and 106B (generally referred to as "106") and an electrical distribution bus 108. The electric machine system 96 of FIG. 2 includes one or more electric machines 110A and 110B (generally referred to as "110") and one or more electric machine (EM) controllers 112A and 112B (generally referred to as "112"). For ease of description, each electric machine 110 of FIG. 2 is described below as being electrically coupled to, controlled by and/or otherwise associated with a single, dedicated one of the EM controllers 112. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 110A, 110B of FIG. 2 includes an electric machine rotor 114A, 114B (generally referred to as "114"), an electric machine stator 116A, 116B (generally referred to as "116") and an electric machine housing 118A, 118B (generally referred to as "118"); e.g., a case. The machine rotor 114 is rotatable about a rotational axis of the machine rotor 114. The machine stator 116 is disposed next to and in electromagnetic communication with the machine rotor 114. The machine stator 116 of FIG. 2, in particular, is radially outboard of and circumscribes the machine rotor 114. With this arrangement, each electric machine 110 is configured as a radial flux electric machine. The electric machines 110 of the present disclosure, however, are not limited to such an exemplary rotor-stator configuration nor to radial flux arrangements. The machine rotor 114, for example, may alternatively be radially outboard of and circumscribe the machine stator 116. In another example, the machine rotor 114 may be axially next to the machine stator 116 configuring the respective electric machine 110 as an axial flux electric machine. Referring again to FIG. 2, the machine rotor 114 and the machine stator 116 are at least partially or completely housed within an interior of the machine housing 118.

Each electric machine 110A, 110B is operatively coupled to a respective one of the engine rotating structures 68A, 68B (generally referred to as "68"). Each machine rotor 114 of FIG. 2, for example, is mechanically coupled to a respective gear system 120A, 120B (generally referred to as "120") of a gearbox 122, where the gearbox 122 may be configured as an accessory gearbox located outside of the engine core 46. Each gearbox gear system 120A, 120B of FIG. 2 is mechanically coupled to a respective one of the engine rotating structures 68A, 68B through a respective gearbox-to-rotating structure (GRS) drivetrain 124A, 124B (generally referred to as "124"). This GRS drivetrain 124 may be configured as or otherwise include a shaft, a tower shaft assembly, another gearbox (e.g., an angle gearbox), and/or the like. The present disclosure, however, is not limited to such an exemplary arrangement. For example, while the electric machines 110 are shown in FIG. 2 mounted to the common gearbox 122, it is contemplated each electric machine 110A, 110B may alternatively be mounted to a different gearbox. Moreover, while the electric machines 110 are generally described above as being located outside of the engine core 46, it is contemplated one or more of the electric machines 110 may alternatively be integrated with the engine core 46.

Each electric machine 110 of FIG. 2 may be configurable as an electric drive motor and/or an electric generator; e.g., an electric motor-generator. For example, during a motor mode of operation, a respective electric machine 110 may operate as the electric motor to convert electricity received from the electrical distribution bus 108 into mechanical power. The machine stator 116, for example, may generate an electromagnetic field with the machine rotor 114 using a current of electricity received from the electrical distribution bus 108 through the respective EM controller 112. This electromagnetic field may drive rotation of the machine rotor 114. The machine rotor 114, in turn, may provide mechanical power to and drive rotation of the respective engine rotating structure 68 through the respective gearbox gear system 120 and the respective GRS drivetrain 124. This mechanical power may be provided to boost power or completely power the rotation of the respective engine rotating structure 68. By contrast, during a generator mode of operation, the electric machine 110 may operate as the electric generator to convert mechanical power received from the respective engine rotating structure 68 into electricity. Rotation of the machine rotor 114, for example, may be rotationally driven by rotation of the respective engine rotating structure 68 through the respective GRS drivetrain 124 and the respective gearbox gear system 120. The rotation of the machine rotor 114 may generate an electromagnetic field with the machine stator 116, and the machine stator 116 may convert energy from the electromagnetic field into electricity. The respective electric machine 110 may then provide a current of electricity to the electrical distribution bus 108 through the respective EM controller 112 for storage and/or further use. The electric machines 110 of the present disclosure, however, are not limited to such exemplary operation. For example, any one or both of the electric machines 110 may alternatively each be configured as a dedicated electric generator; e.g., without the electric motor functionality. Any one or both of the electric machines 110 may alternatively each be configured as a dedicated electric motor; e.g., without the electric generator functionality.

Each EM controller 112A, 112B includes a controller housing 126A, 126B (generally referred to as "126") and internal controller circuitry 128A, 128B (generally referred to as "128"). The controller housing 126 may be configured as an enclosed case (e.g., a closed or sealed container) for the respective controller circuitry 128. The controller circuitry 128 is disposed within an interior of the controller housing 126; e.g., an internal chamber or other volume(s) within and enclosed by the controller housing 126. The controller circuitry 128 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 112A, 112B is electrically coupled to a respective one of the electric machines 110A, 110B through, for example, one or more electrical couplings 130A, 130B (generally referred to as "130"). The controller circuitry 128 of each EM controller 112 of FIG. 2, for example, is electrically coupled to the respective electric machine 110 and its machine stator 116 through the respective electric couplings 130. Similarly, each EM controller 112A, 112B is electrically coupled to the electrical distribution bus 108 through, for example, one or more electric couplings 132A, 132B (generally referred to as "132"). The controller circuitry 128 of each EM controller 112 of FIG. 2, for example, is electrically coupled to the electrical distribution bus 108 through the respective electric couplings 132. Examples of the electrical couplings 130, 132 include, but are not limited to, high voltage electric cables, power feeder cables, power buses, and/or the like.

Each EM controller 112 and its controller circuitry 128 are configured to control operation of a respective one of the electric machines 110A, 110B. For example, when operating as the electric motor, the respective EM controller 112 and its controller circuitry 128 are configured to regulate a flow of electricity from the electrical distribution bus 108 to the respective electric machine 110. This electricity flow regulation may include: (a) turning-on the flow of electricity from the electrical distribution bus 108 to the respective electric machine 110 (e.g., electrically coupling the respective electric machine 110 to the electrical distribution bus 108); (b) turning-off the flow of electricity from the electrical distribution bus 108 to the respective electric machine 110 (e.g., electrically decoupling the respective electric machine 110 from the electrical distribution bus 108); (c) moderating the flow of electricity from the electrical distribution bus 108 to the respective electric machine 110. Here, the respective EM controller 112 operates as a motor controller. In another example, when operating as the electric generator, the respective EM controller 112 and its controller circuitry 128 are configured to regulate a flow of electricity from the respective electric machine 110 to the electrical distribution bus 108. This electricity flow regulation may include: (a) turning-on the flow of electricity from the respective electric machine 110 to the electrical distribution bus 108 (e.g., electrically coupling the respective electric machine 110 to the electrical distribution bus 108); (b) turning-off the flow of electricity from the respective electric machine 110 to the electrical distribution bus 108 (e.g., electrically decoupling the respective electric machine 110 from the electrical distribution bus 108); (c) moderating the flow of electricity from the respective electric machine 110 to the electrical distribution bus 108. Here, the respective EM controller 112 operates as a generator controller.

The aircraft power storage 98 is arranged with an airframe of the aircraft and is located remote from the aircraft propulsion system 22. This aircraft power storage 98 is configured to receive electricity from the electrical distribution bus 108 and store that received electricity as potential energy. The aircraft power storage 98 is also configured to release the stored potential energy as electricity output into the electrical distribution bus 108. The aircraft power storage 98, for example, may be configured as or otherwise include one or more electricity storage devices; e.g., batteries, super capacitors, etc.

The propulsion system power storage 100 is arranged onboard the aircraft propulsion system 22 and configured with its propulsion system housing 26 (see FIG. 1). This propulsion system power storage 100 is configured to receive electricity from the electrical distribution bus 108 and store that received electricity as potential energy. The propulsion system power storage 100 is also configured to release the stored potential energy as electricity output into the electrical distribution bus 108. The propulsion system power storage 100, for example, may be configured as or otherwise include one or more electricity storage devices; e.g., batteries, super capacitors, etc.

The aircraft power source 102 is configured to generate electricity and provide that electricity to the electrical distribution bus 108. The aircraft power source 102, for example, may be configured as an electric generator powered by the turbine engine 24 (see FIG. 1). In another example, the aircraft power source 102 may be configured as an electric generator powered by another aircraft powerplant; e.g., an engine of a companion aircraft propulsion system, an engine of an auxiliary power unit (APU), a fuel cell system, and/or the like.

The ground power source 104 is configured to provide electricity to the electrical distribution bus 108, which electricity may be generated by the ground power source 104 or another power source. The aircraft power source 102, for example, may be configured as a ground-based electrical generator or an electric grid.

Figure 3:
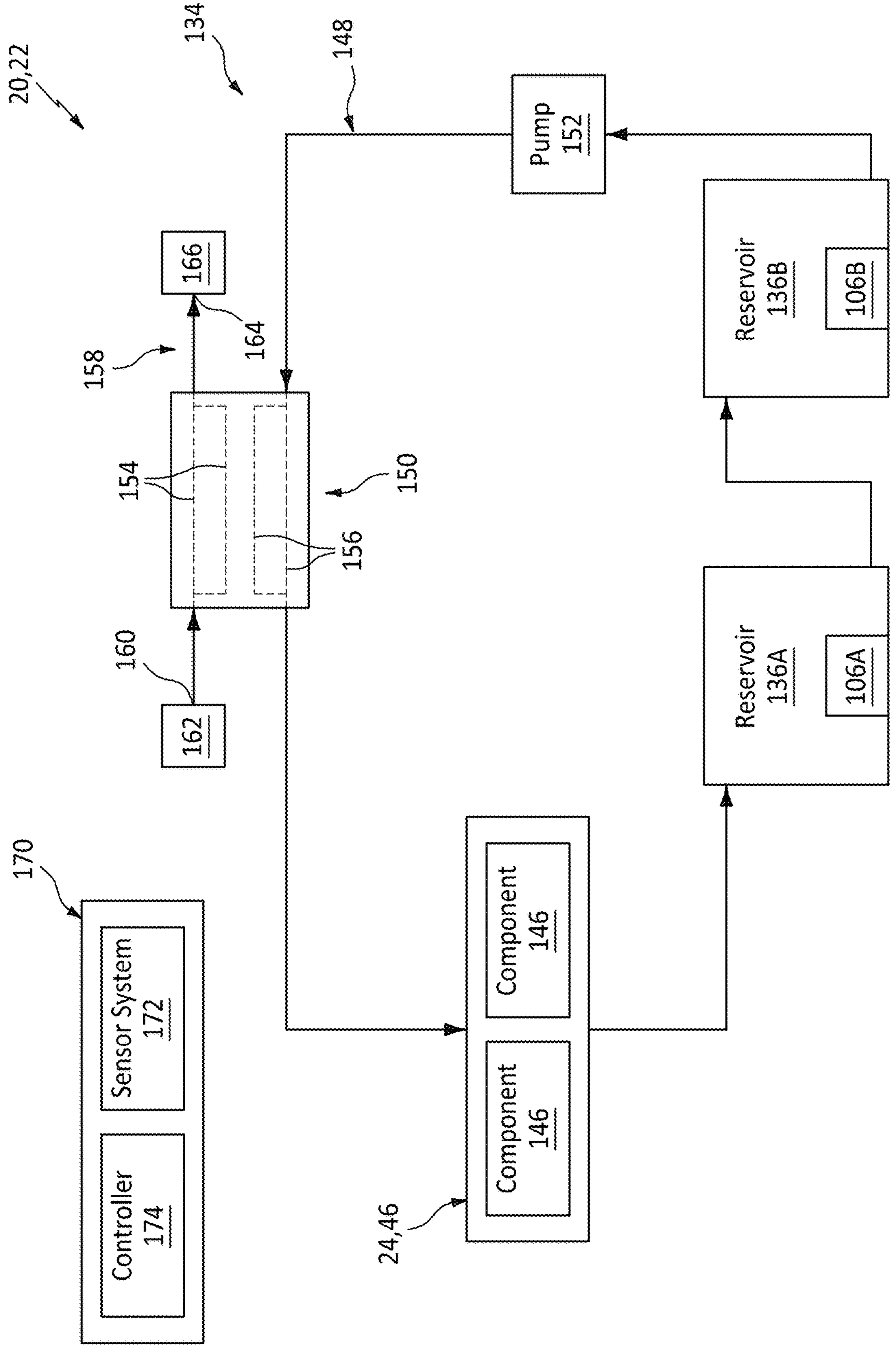
FIG. 3 is a schematic illustration of a portion of the aircraft propulsion system with a lubrication system.

The electric heaters 106 are arranged with a lubrication system 134 for the aircraft propulsion system 22 and its turbine engine 24; see also FIG. 3. The first electric heater 106A of FIG. 2, for example, is arranged in thermal communication with a quantity of lubricant (e.g., engine oil) contained within a first lubricant reservoir 136A of the lubrication system 134. More particularly, the first electric heater 106A of FIG. 2 is disposed within an interior of the first lubricant reservoir 136A and immersed within the lubricant contained within the first lubricant reservoir 136A. The first electric heater 106A is thereby operatable to heat the lubricant contained within the first lubricant reservoir 136A when that first electric heater 106A is turned on; e.g., electrically energized. Similarly, the second electric heater 106B of FIG. 2 is arranged in thermal communication with a quantity of the lubricant contained within a second lubricant reservoir 136B of the lubrication system 134. More particularly, the second electric heater 106B of FIG. 2 is disposed within an interior of the second lubricant reservoir 136B and immersed within the lubricant contained within the second lubricant reservoir 136B. The second electric heater 106B is thereby operatable to heat the lubricant contained within the second lubricant reservoir 136B when that second electric heater 106B is turned on; e.g., electrically energized. Each of the electric heaters 106 may be configured as or otherwise include one or more electrical resistive elements. The present disclosure, however, is not limited to such an exemplary electric heater arrangement. For example, one or both of the electric heaters 106 may be disposed outside of the respective lubricant reservoir 136, where the respective electric heater 106 is thermally coupled to the lubricant contained within the respective lubricant reservoir 136 through a sidewall of that lubricant reservoir 136. Moreover, while each lubricant reservoir 136 is described above with a dedicated electric heater, it is contemplated one of the electric heaters 106A or 106B may be omitted.

The electrical distribution bus 108 is electrically coupled to the electric machines 110 through their respective EM controllers 112 as described above. The electrical distribution bus 108 is electrically coupled to the aircraft power storage 98, the propulsion system power storage 100, the aircraft power source 102 and the electric heaters 106A and 106B through one or more respective electrical couplings 138-142. The electrical distribution bus 108 may also be electrically coupled to the ground power source 104 through one or more electrical couplings 143 when the aircraft is on ground, for example parked at a terminal gate or other aircraft parking location. Examples of the electrical couplings 138-143 include, but are not limited to, high voltage electric cables, power feeder cables, power buses, and/or the like. With this arrangement, the electrical distribution bus 108 provides an intermediate connection between the various electrical members 98, 100, 102, 104, 106A, 106B, 110A (via 112A) and/or 110B (via 112B). One or more of the power storages 98, 100 may thereby each receive electricity generated by one or more of the electric machines 110 (when operated as electric generators), the aircraft power source 102, the ground power source 104 and/or the other one of the power storages 100, 98 through the electrical distribution bus 108. Similarly, one or more of the electric machines 110 (when operated as electric motors) and/or one or more of the electric heaters 106 may receive electricity from one or more of the power storages 98, 100, one or more of the power sources 102, 104 and/or one or more of the other electric machines 110 (when operated as electric generators) through the electrical distribution bus 108. Moreover, it is contemplated the electrical distribution bus 108 may (or may not) also be electrically coupled to and provide the intermediate connection with one or more additional electric components of the aircraft propulsion system 22 and/or one or more additional electric components of the aircraft outside of the aircraft propulsion system 22. Examples of the additional electric components of the aircraft propulsion system 22 include, but are not limited to, sensors, actuators, pumps, valves, an electronic engine controller for the turbine engine 24, and/or the like. Examples of the additional electric components of the aircraft outside of the aircraft propulsion system 22 include, but are not limited to, electric devices mounted with an airframe of the aircraft, electric devices onboard a companion aircraft propulsion system, and/or the like.

Referring to FIG. 3, the lubrication system 134 is configured to lubricate, cool and/or otherwise service one or more components 146 of the aircraft propulsion system 22 and its turbine engine 24 using the lubricant. Examples of these engine components 146 include, but are not limited to, bearing(s) supporting the high speed rotating structure 68A (see FIG. 1), bearing(s) supporting the low speed rotating structure 68B (see FIG. 1), bearing(s) supporting the propulsor rotor 60 (see FIG. 1), bearing(s) supporting the RSP drivetrain 72 (see FIG. 1), bearing(s) and/or gear(s) within the geartrain 74 (see FIG. 1), bearing(s) and/or gear(s) within the gearbox 122 (see FIG. 2), bearing(s) supporting the GRS drivetrain(s) 124 (see FIG. 2), actuator(s), lubricated seal member(s), and/or the like. The lubrication system 134 of FIG. 3 includes a lubricant circuit 148 (e.g., a fluid passage), a heat exchanger 150, a lubricant pump 152 and the one or more lubricant reservoirs 136A and 136B (generally referred to as "136").

The first lubricant reservoir 136A, the second lubricant reservoir 136B, the lubricant pump 152 and the heat exchanger 150 may be arranged longitudinally inline along the lubricant circuit 148. The lubricant circuit 148 of FIG. 3, for example, serially extends longitudinally through the first lubricant reservoir 136A, the second lubricant reservoir 136B, the lubricant pump 152 and the heat exchanger 150 in a closed loop. The lubricant circuit 148 of FIG. 3 is also fluidly coupled with, extends longitudinally through and/or is arranged in thermal communication with the engine components 146 serviced by the lubricant circuit 148. Some or all of these engine components 146 may be arranged serially along the lubricant circuit 148. In addition or alternatively, some or all of the engine components 146 may be arranged in parallel along the lubricant circuit 148. The present disclosure, however, is not limited to the exemplary arrangement of components along the lubricant circuit 148 shown in FIG. 3. For example, while the lubricant pump 152 and the lubricant reservoirs 136 are downstream of the engine components 146 and upstream of the heat exchanger 150 in FIG. 3, the lubricant pump 152, the first lubricant reservoir 136A and/or the second lubricant reservoir 136B may alternatively be arranged downstream of the heat exchanger 150 and upstream of the engine components 146. Moreover, the lubrication system 134 may (or may not) also include one or more additional components arranged along the lubricant circuit 148 such as filter(s), sensor(s), additional heat exchanger(s), additional component(s), valve(s), pump(s), etc. In addition or alternatively, it is contemplated one of the lubricant reservoirs 136A, 136B may be omitted.

The heat exchanger 150 of FIG. 3 includes one or more internal air passages 154 and one or more internal lubricant passages 156. Each of these heat exchanger passages 154, 156 may be partially or completely formed by the heat exchanger 150. Each of the heat exchanger passages 154, 156 also extends within and/or through the heat exchanger 150. The air passages 154 in the heat exchanger 150 may form a section of an air circuit 158 extending longitudinally through the heat exchanger 150. Briefly, an airflow inlet 160 into the air circuit 158 may be fluidly coupled to an air source 162 such as the bypass flowpath 50 (see FIG. 1), and an airflow outlet 164 from the air circuit 158 may be fluidly coupled to an air sink 166 such as the bypass flowpath 50 or the external environment 84 (see FIG. 1). Referring still to FIG. 3, the lubricant passages 156 may form a section of the lubricant circuit 148 extending longitudinally through the heat exchanger 150. Within the heat exchanger 150, the air passages 154 and the lubricant passages 156 may be arranged to configure the heat exchanger 150 as a crossflow heat exchanger, a counterflow heat exchanger, a parallel flow heat exchanger, or a hybrid heat exchanger with a combination crossflow, counterflow and/or parallel flow arrangement. This heat exchanger 150 of FIG. 3 is also configured as an air-to-lubricant heat exchanger; e.g., an air-to-oil cooler (AOC). The present disclosure, however, is not limited to such an exemplary arrangement. For example, it is contemplated the heat exchanger 150 may alternatively provide a thermal coupling between the lubricant circuit 148 and a fuel circuit configured to deliver fuel to the combustor section 42 and its fuel injectors 92 (see FIG. 1) or another working fluid system for the aircraft.

The lubricant pump 152 is configured to circulate a flow of the lubricant through the lubricant circuit 148. The lubricant pump 152 of FIG. 3, for example, directs the flow of the lubricant from the lubricant reservoirs 136, through the heat exchanger 150 and the engine components 146, and back to the lubricant reservoirs 136. The lubricant pump 152 may be configured as a mechanical lubricant pump. For example, referring to FIG. 2, a pump rotor 168 in the lubricant pump 152 may be operatively coupled to first electric machine 110A through the first gearbox gear system 120A. Alternatively, the lubricant pump 152 of FIG. 3 may be configured as an electrical lubricant pump which receives electrical power from the electrical distribution bus 108. However, for ease of description, the lubricant pump 152 may be described below as the mechanical lubricant pump.

Each of the lubricant reservoirs 136 is configured to contain a quantity of the lubricant fluid before, during and/or after lubrication system operation. Each lubricant reservoir 136, for example, may be configured as or otherwise include a tank, a cylinder, a pressure vessel, a bladder or any other type of (e.g., liquid) storage container. In some embodiments, the first lubricant reservoir 136A may be configured as a main lubricant reservoir for the lubrication system 134, and the second lubricant reservoir 136B may be configured as an auxiliary lubricant reservoir for the lubrication. Alternatively, the second lubricant reservoir 136B may be configured as the main lubricant reservoir for the lubrication system 134, and the first lubricant reservoir 136A may be configured as the auxiliary lubricant reservoir for the lubrication. Here, the main lubricant reservoir may be configured to contain a larger quantity of the lubricant than the auxiliary lubricant reservoir. The main lubricant reservoir may also or alternatively be configured to contain a quantity of the lubricant for a longer period of time than the auxiliary lubricant reservoir.

Operational control of the aircraft propulsion system 22 and its various members (e.g., 96 and 134) of FIGS. 1-3 is facilitated by a control system 170 as shown in FIG. 3. This control system 170 includes a sensor system 172 and a controller 174. The sensor system 172 is configured to measure various operational parameters for the aircraft propulsion system 22. These operational parameters include, among various others, a temperature of the lubricant in the lubricant circuit 148. The sensor system 172, for example, may include one or more temperature sensors. The fluid temperature may be measured within one or more of the lubricant reservoirs 136A, 136B. The fluid temperature may also or alternatively be measured elsewhere along the lubricant circuit 148 upstream and/or downstream of the lubricant reservoirs 136A, 136B; e.g., at a manifold upstream of and distributing the lubricant to some or all of the engine components 146.

The controller 174 of FIG. 3 is configured in signal communication (e.g., hardwired and/or wirelessly coupled) with: the sensor system 172; one or more components of the turbine engine 24 of FIG. 1 (e.g., actuators, pumps, valves, etc.); one or more components of the electric machine system 96 of FIG. 2 (e.g., the EM controllers 112); and/or one or more components of the lubrication system 134 of FIG. 3 (e.g., the lubricant pump 152 where that pump is an electric lubricant pump). The controller 174 may be configured as an onboard engine controller. The controller 174, for example, may be configured as an electronic engine controller (EEC), an electronic control unit (ECU), a full-authority digital engine controller (FADEC), etc. The controller 174 may be implemented with a combination of hardware and software. The hardware may include memory and at least one processing device, which processing device may include one or more single-core and/or multi-core processors. The hardware may also or alternatively include analog and/or digital circuitry other than that described above. The memory is configured to store software (e.g., program instructions) for execution by the processing device, which software execution may control and/or facilitate performance of one or more operations such as those described herein. The memory may be a non-transitory computer readable medium. For example, the memory may be configured as or include a volatile memory and/or a nonvolatile memory.

In cold climates, the lubricant within the lubrication system 134 of FIG. 3 may become relatively cold while the aircraft is on ground and the aircraft propulsion system 22 is non-operational (e.g., turned off, de-powered) for an extended period of time. The lubricant, however, is typically selected to provide certain characteristics (e.g., viscosity, lubricity, etc.) at elevated temperatures such as those experienced during operation of the turbine engine 24 above an idle power setting. Therefore, when the lubricant is below a threshold temperature, the lubricant is ideally heated prior to starting the turbine engine 24 and/or operating the turbine engine 24 above its idle power setting. Such heating may be facilitated by use of auxiliary heaters (e.g., space heaters) which direct warm air into an interior or the inner housing structure 28 (see FIG. 1). However, use of such auxiliary heaters requires additional infrastructure at aircraft airports. Alternatively, the heating may be facilitated by starting up the turbine engine 24 and operating the turbine engine 24 at its idle power setting for an extended period of time. However, operating the turbine engine 24 at the idle power setting for such an extended period of time may significantly increase fuel consumption as well as delay aircraft flight. To address the foregoing challenges, the aircraft propulsion system 22 and its various members of FIGS. 1-3 are configured to operate in one or more warmup modes which obviate (or reduce) the use of auxiliary heaters, reduce fuel consumption as well as reducing warmup time prior to aircraft flight. An example of such operation is described below with respect to FIG. 4.

Figure 4:
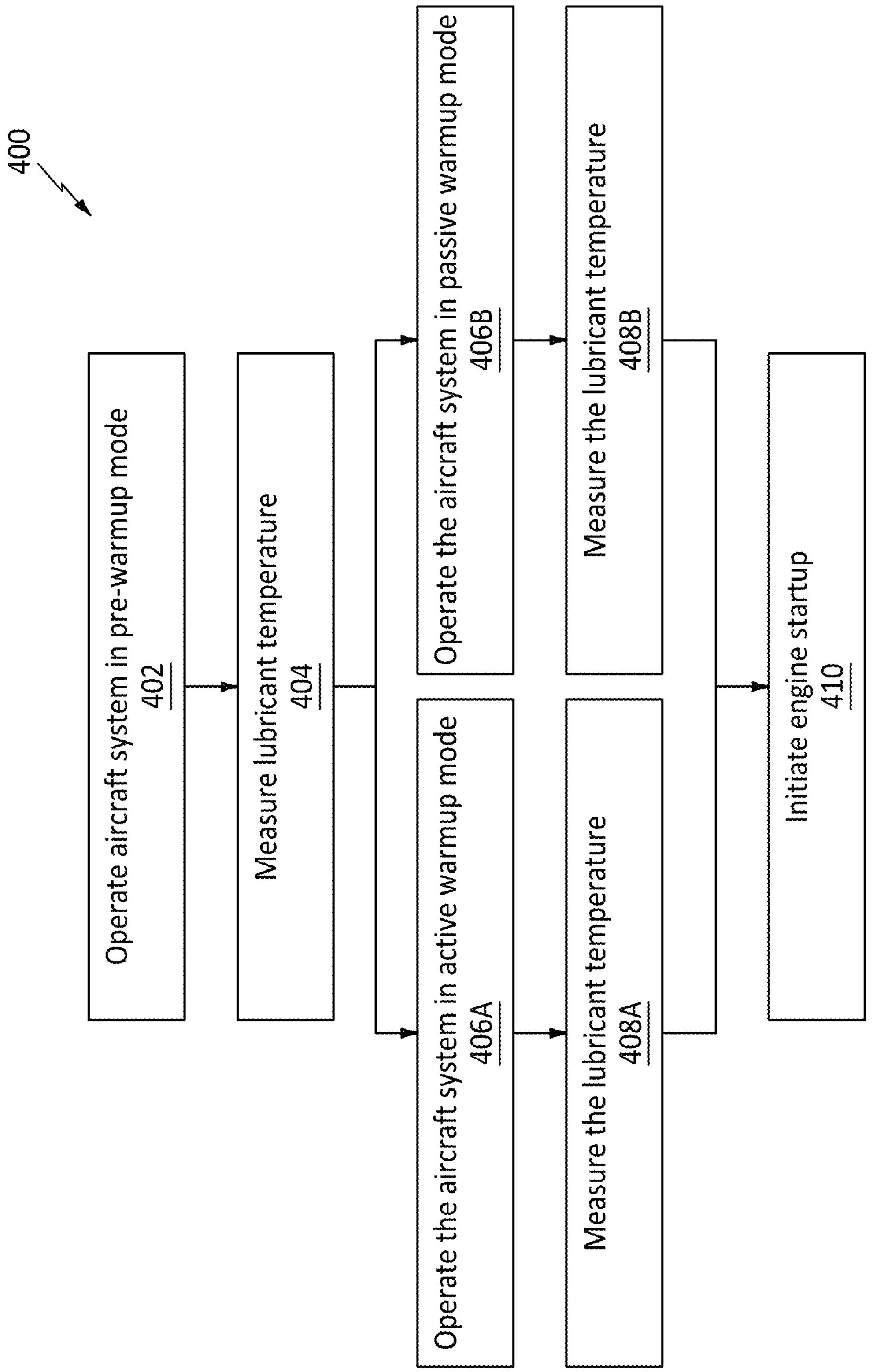
FIG. 4 is a flow diagram of a method for operating an aircraft system.

FIG. 4 is a flow diagram of a method 400 for operating an aircraft system. For ease of description, the aircraft system is described below as including the aircraft propulsion system 22 of FIG. 1, the electrical system 94 of FIG. 2 and the lubrication system 134 of FIG. 3. The operating method 400 of the present disclosure, however, is not limited to such an exemplary aircraft system.

Prior to performance of the operating method 400 of FIG. 4, the turbine engine 24 is shutdown (non-operational) and at least the temperature of the lubricant within the lubrication system 134 is below an engine startup threshold temperature. While the turbine engine 24 is shutdown, no combustion products are generated, the combustor is flamed out and fuel is not provided to the combustor section 42. The engine rotating structures 68 may also be substantially or completely stationary. Note, under certain conditions, it is contemplated one or more of the engine rotating structures 68 may be rotationally driven by windmilling of the propulsor rotor 60 and/or turned for various purposes post shutdown. Also prior to the performance of the operating method 400 of FIG. 4, the electric machines 110 may be non-operational unless, for example, one or both of these electric machines 110 are utilized for the post shutdown rotating structure turning.

In step 402, the aircraft system is operated in a pre-warmup mode. During this pre-warmup mode, the control system 170 signals the electric machine system 96 to drive rotation of at least (or only) the high speed rotating structure 68A and the pump rotor 168. The control system 170, for example, may signal the first EM controller 112A to facilitate operation of the first electric machine 110A as an electric motor at a relatively slow speed. Here, the first electric machine 110A may drive the rotation of the high speed rotating structure 68A at a sub-idle rotational speed. This sub-idle rotational speed is a rotational speed that is less than a speed the high speed rotating structure 68A rotates while the turbine engine 24 is operating at its idle power setting. The sub-idle rotational speed is also less than a speed the high speed rotating structure 68A rotates during startup of the turbine engine 24. During such operation, the first electric machine 110A and its first EM controller 112A may be operated at a reduced power setting. This reduced power setting may be equal to or less than forty percent (40%), thirty percent (30%) or even twenty percent (20%) of a (e.g., maximum or average) power setting at which those electric machine system components (e.g., 110A and 112A) are designed to operate during normal (e.g., non-emergency) aircraft flight.

In step 404, a temperature of the lubricant is determined while the aircraft system is operating in the pre-warmup mode. This lubricant temperature may be measured using the sensor system 172 and evaluated by the controller 174. Where the lubricant temperature is less than an auxiliary heating threshold temperature, the operating method 400 may proceed to step 406A. Where the lubricant temperature is equal to or greater than the auxiliary heating threshold temperature, the operating method 400 may proceed to step 406B.

In the step 406A, the aircraft system is operated in an active warmup mode following the pre-warmup mode. During this active warmup mode, the control system 170 continues to signal the electric machine system 96 to drive rotation of at least (or only) the high speed rotating structure 68A and the pump rotor 168. The rotating pump rotor 168 pumps the lubricant through the lubricant circuit 148. As this lubricant interacts with and services the engine components 146, the lubricant may receive heat energy from those engine components 146. The lubricant may thereby be passively heated as the lubricant is lubricating, cooling and/or otherwise servicing the engine components 146. In addition, the control system 170 signals the electrical system 94 to turn on (e.g., energize) one or more of the electric heaters 106. The electric heaters 106 may thereby actively heat the lubricant within the respective lubricant reservoirs 136. By actively heating the lubricant using the electric heater(s) 106 in addition to passively heating the lubricant through the pumping of the lubricant and the servicing of the engine components 146, the lubricant may be heated up relatively quickly; e.g., compared to passive heating alone.

In step 408A, the temperature of the lubricant is determined while the aircraft system is operating in the active warmup mode. This lubricant temperature may be measured using the sensor system 172 and evaluated by the controller 174. Where the lubricant temperature is less than the engine startup threshold temperature, the operating method 400 may continue to perform the step 406A. Where the lubricant temperature is equal to or greater than the engine startup threshold temperature, the operating method 400 may proceed to step 410.

In the step 406B, the aircraft system is operated in a passive warmup mode following the pre-warmup mode (or optionally following or before the active warming mode). During this passive warmup mode, the control system 170 continues to signal the electric machine system 96 to drive rotation of at least (or only) the high speed rotating structure 68A and the pump rotor 168. The rotating pump rotor 168 pumps the lubricant through the lubricant circuit 148. As this lubricant interacts with and services the engine components 146, the lubricant may receive heat energy from those engine components 146. The lubricant may thereby be passively heated as the lubricant is lubricating, cooling and/or otherwise servicing the engine components 146. Here, the electric heaters 106 may be turned off; e.g., de-energized and non-operational. The lubricant may thereby be heated during the passive warmup mode without use of the electric heaters 106.

In step 408B, the temperature of the lubricant is determined while the aircraft system is operating in the passive warmup mode. This lubricant temperature may be measured using the sensor system 172 and evaluated by the controller 174. Where the lubricant temperature is less than the engine startup threshold temperature, the operating method 400 may continue to perform the step 406B. Where the lubricant temperature is equal to or greater than the engine startup threshold temperature, the operating method 400 may proceed to the step 410.

In the step 410, the control system 170 initiates startup of the turbine engine 24. This turbine engine startup may be initiated after the control system 170 determines the lubricant has been heated to a temperature that is equal to or greater than the engine startup threshold temperature. In some examples, an optional additional step may include receiving an indication from an operator (e.g., pilot) to initiate the start sequence. In such examples, the control system 170 may maintain the lubricant at or about the engine startup threshold temperature and responsive to receiving the indication from the operator, may initiate the turbine engine startup. Following the initiation of the turbine engine startup, the first electric machine 110A may speed up the rotation of the high speed rotating structure 68A to a startup speed. A fuel system for the turbine engine 24 may provide fuel to the fuel injectors 92 (see FIG. 1) for injection into the combustion chamber 88. Within the combustion chamber 88, the fuel may mix with air and subsequently ignited to generate combustion products. Once enough combustion products are produced to maintain or increase the rotational speed of the high speed rotating structure 68A to its idle rotational speed, power to the first electric machine 110A may be cut off. Following this turbine engine startup, the aircraft propulsion system 22 may be operated per normal procedure; e.g., as if the temperature of the lubricant was not previously below the engine startup threshold temperature. During this engine startup step 410, the electric heaters 106 may be turned off. Alternatively, it is contemplated one or more of the electric heaters 106 may be turned on during, for example, at least an initial period of the engine startup step 410.

In some embodiments, the pre-warmup step 402 may be omitted from the operating method 400.

In some embodiments, the step 406B may be performed as an intermediate step between the active warmup mode (the step 406A) and the initiation of engine startup (the step 410).

In some embodiments, the lubricant within one or both of the lubricant reservoirs 136 may be preheated using the respective electric heaters 106 prior to performance of the step 402 or the step 406A and/or 406B. This may be particularly useful where the lubricant pump 152 is configured as the electric lubricant pump and is thereby operable to circulate the lubricant before the high speed rotating structure 68A is actively rotated. However, there is also a benefit to such preheating where the lubricant pump 152 is configured as the mechanical lubricant pump.

The operating method 400 is described above with the first electric machine 110A driving the rotation of the high speed rotating structure 68A as needed prior to the initiation of the turbine engine startup. In other embodiments, referring to FIG. 2, the electrical system 94 may include an optional electric turning motor 176 (e.g., a core turning motor) for driving the rotation of the high speed rotating structure 68A as needed prior to the initiation of the turbine engine startup. With such an arrangement, it is contemplated the first electric machine 110A may be non-operational during one or more or all of the warmup modes prior to the initiation of the turbine engine startup.

The turning motor 176 includes an electric motor rotor 178, an electric motor stator 180 and an electric motor housing 182; e.g., a case. The motor stator 180 of FIG. 2 is radially outboard of and circumscribes the motor rotor 178. With this arrangement, the turning motor 176 is configured as a radial flux electric motor. The turning motor 176 of the present disclosure, however, is not limited to such an exemplary rotor-stator configuration nor to radial flux arrangements. The motor rotor 178, for example, may alternatively be radially outboard of and circumscribe the motor stator 180. In another example, the motor rotor 178 may be axially next to the motor stator 180 configuring the turning motor 176 as an axial flux electric motor. Referring again to FIG. 2, the motor rotor 178 and the motor stator 180 are at least partially or completely housed within an interior of the motor housing 182. This turning motor 176 may also include an integrated motor controller 184 for regulating electricity directed from the electrical distribution bus 108 to the motor stator 180. This electricity may be regulated in a similar manner as described above with respect to operation of a respective EM controller 112 when operating as the motor controller 184. Of course, in other embodiments, it is contemplated the motor controller 184 may be configured discrete from the turning motor 176.

The turning motor 176 is operatively coupled to the turbine engine 24 and its engine core 46. More particularly, the turning motor 176 and its motor rotor 178 are operatively coupled to at least one of the engine rotating structures 68A and/or 68B. The motor rotor 178 of FIG. 2, for example, is mechanically coupled to the first gearbox gear system 120A, where the first gearbox gear system 120A is operatively coupled to the high speed rotating structure 68A through the first GRS drivetrain 124A as described above. The present disclosure, however, is not limited to such an exemplary arrangement. For example, it is contemplated the turning motor 176 and its motor rotor 178 may be operatively coupled to the high speed rotating structure 68A independent of the gearbox 122 and/or the operatively coupling associated with the first electric machine 110. Moreover, while the turning motor 176 is generally described above as being located outside of the engine core 46, it is contemplated the turning motor 176 may alternatively be integrated with the engine core 46.

The electrical distribution bus 108 is electrically coupled to the turning motor 176 through one or more respective electrical couplings 186. Examples of the electrical couplings 186 include, but are not limited to, high voltage electric cables, power feeder cables, power buses, and/or the like. With this arrangement, the electrical distribution bus 108 provides an intermediate connection for the turning motor 176 in a similar manner as described above with respect to the various electrical members 98, 100, 102, 104, 106A, 106B, 110A (via 112A) and/or 110B (via 112B).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating an aircraft system, comprising:
the aircraft system including a turbine engine, a lubrication system and an electrical system, the turbine engine including a flowpath, a rotating structure, one or more engine components, a compressor section, a combustor section and a turbine section, the flowpath extending through the compressor section, the combustor section and the turbine section, the rotating structure comprising a first bladed engine rotor in the compressor section or the turbine section, the lubrication system configured to lubricate the one or more engine components using lubricant, the lubrication system comprising a first reservoir configured to contain a first quantity of the lubricant, and the electrical system comprising a first electric heater in thermal communication with the first quantity of the lubricant contained in the first reservoir;
determining a first temperature of the lubricant;
operating the aircraft system in a first warmup mode when the first temperature of the lubricant is below a first threshold, the operating of the aircraft system in the first warmup mode comprising driving rotation of the rotating structure about an axis and heating the first quantity of the lubricant contained in the first reservoir using the first electric heater;
determining a second temperature of the lubricant; and
initiating a startup of the turbine engine following the operating of the aircraft system in the first warmup mode and when the second temperature of the lubricant is equal to or above a second threshold that is greater than the first threshold.

2. The method of claim 1, wherein the one or more engine components comprise a bearing rotatably supporting the rotating structure.

3. The method of claim 1, wherein the rotating structure is rotatably driven about the axis during the first warmup mode using a drivetrain component, and the one or more engine components comprise the drivetrain component.

4. The method of claim 1, wherein the rotating structure is rotated about the axis during the first warmup mode at a sub-idle rotational speed.

5. The method of claim 1, wherein
during the first warmup mode, the driving of the rotation of the rotating structure about the axis is at a first rotational speed; and
the method further comprising driving rotation of the rotating structure about the axis at a second rotational speed during the startup of the turbine engine, the second rotational speed greater than the first rotational speed.

6. The method of claim 1, further comprising operating the aircraft system in a second warmup mode prior to the operating of the aircraft system in the first warmup mode, the operating of the aircraft system in the second warmup mode comprising driving rotation of the rotating structure about the axis while the first electric heater is turned off.

7. The method of claim 1, further comprising operating the aircraft system in a second warmup mode prior to the operating of the aircraft system in the first warmup mode, the operating of the aircraft system in the second warmup mode comprising heating the first quantity of the lubricant contained in the first reservoir using the first electric heater while the rotating structure is stationary or windmilling.

8. The method of claim 1, further comprising operating the aircraft system in a second warmup mode when the first temperature of the lubricant is equal to or above the first threshold, the operating of the aircraft system in the second warmup mode comprising driving rotation of the rotating structure about the axis while the first electric heater is turned off.

9. The method of claim 1, wherein the lubrication system further comprises a second reservoir configured to contain a second quantity of the lubricant, the electrical system further comprises a second electric heater in thermal communication with the second quantity of the lubricant contained in the second reservoir, and the operating of the aircraft system in the first warmup mode further comprises heating the second quantity of the lubricant contained in the second reservoir using the second electric heater.

10. The method of claim 1, wherein the lubrication system further comprises a second reservoir configured to contain a second quantity of the lubricant, the first reservoir is a main reservoir for the lubrication system, and the second reservoir is an auxiliary reservoir for the lubrication system.

11. The method of claim 1, wherein the lubrication system further comprises a second reservoir configured to contain a second quantity of the lubricant, the first reservoir is an auxiliary reservoir for the lubrication system, and the second reservoir is a main reservoir for the lubrication system.

12. The method of claim 1, further comprising generating electricity using an electric machine and storing the electricity using a power storage, wherein the first electric heater is electrically powered using the power storage.

13. The method of claim 12, wherein the electric machine drives the rotation of the rotating structure about the axis and the electric machine is electrically powered using the power storage during the operating of the aircraft system in the first warmup mode.

14. The method of claim 1, wherein an electric motor drives the rotation of the rotating structure about the axis and the electric motor and the first electric heater are electrically powered using a power source during the operating of the aircraft system in the first warmup mode, and the power source is disposed remote from the turbine engine.

15. A method for operating an aircraft system, comprising:

the aircraft system including a turbine engine, a lubrication system and an electrical system, the turbine engine including a flowpath, a rotating structure, one or more engine components, a compressor section, a combustor section and a turbine section, the flowpath extending through the compressor section, the combustor section and the turbine section, the rotating structure comprising a bladed engine rotor in the compressor section or the turbine section, the lubrication system configured to lubricate the one or more engine components using lubricant, the lubrication system comprising a reservoir configured to contain a quantity of the lubricant, and the electrical system comprising an electric machine and a electric heater, the electric machine operatively coupled to the rotating structure, and the electric heater in thermal communication with the quantity of the lubricant contained in the reservoir;

operating the aircraft system in a first warmup mode, the operating of the aircraft system in the first warmup mode comprising heating the quantity of the lubricant contained in the reservoir using the electric heater;

operating the aircraft system in a second warmup mode following the operating of the aircraft system in the first warmup mode, the operating of the aircraft system in the second warmup mode comprising driving rotation of the rotating structure about an axis at a first rotational speed using the electric machine;

initiating a startup of the turbine engine following the operating of the aircraft system in the second warmup mode; and following the initiating of the startup of the turbine engine, driving rotation of the rotating structure about the axis at a second rotational speed using the electric machine, the second rotational speed greater than the first rotational speed.

16. The method of claim 15, wherein at least one of the aircraft system is operated in the first warmup mode while the electric machine is turned off; or the aircraft system is operated in the second warmup mode while the electric heater is turned off.

17. The method of claim 15, wherein the operating of the aircraft system in the first warmup mode further comprises driving rotation of the rotating structure about the axis using the electric machine, and the aircraft system is operated in the second warmup mode while the electric heater is turned off.

18. The method of claim 15, wherein the electric machine drives the rotation of the rotating structure at the second rotational speed until combustion within the turbine engine is started.

19. An aircraft system, comprising:

a turbine engine including a flowpath, a rotating structure, one or more engine components, a compressor section, a combustor section and a turbine section, the flowpath extending through the compressor section, the combustor section and the turbine section, the rotating structure comprising a compressor rotor in the compressor section and a turbine rotor in the turbine section;

a lubrication system configured to lubricate the one or more engine components using lubricant, the lubrication system comprising a reservoir configured to contain a quantity of the lubricant;

an electrical system comprising a motor-generator and a electric heater, the motor-generator operatively coupled to the rotating structure, and the electric heater in thermal communication with the quantity of the lubricant contained in the reservoir; and a control system configured to operate the aircraft system in a first warmup mode and subsequently in a startup mode, wherein during the first warmup mode the motor-generator drives rotation of the rotating structure about an axis at a first rotational speed and the electric heater heats the quantity of the lubricant contained in the reservoir, and wherein during the startup mode the motor-generator drives rotation of the rotating structure about an axis at a second rotational speed greater than the first rotational speed and subsequently combustion within the turbine engine is started.

20. The aircraft system of claim 19, wherein the control system is further configured to determine a first temperature of the lubricant;

operate the aircraft system in the first warmup mode when the first temperature of the lubricant is below a first threshold;

determine a second temperature of the lubricant; and operate the aircraft system in the startup mode when the second temperature of the lubricant is equal to or above a second threshold that is greater than the first threshold.

* * * * *